United States Patent [19]

Hunter et al.

[11] Patent Number: 4,936,069
[45] Date of Patent: Jun. 26, 1990

[54] MODULAR BUILDING PANEL HAVING AN IMPROVED OFFSET THERMAL BARRIER JOINT

[75] Inventors: A. Reese Hunter; Jack A. Brady, both of Greensboro; John L. Drane, Clemons, all of N.C.

[73] Assignee: Industrial Air, Inc., Greensboro, N.C.

[21] Appl. No.: 364,977

[22] Filed: Jun. 9, 1989

[51] Int. Cl.$^5$ ............................ E04C 1/04; E04B 2/10
[52] U.S. Cl. ................................. 52/309.4; 52/309.9; 52/586; 52/282; 52/573; 52/809; 49/DIG. 1
[58] Field of Search ................. 52/282, 309.9, 309.11, 52/582, 403, 309.4; 49/DIG. 1, DIG. 2

[56] References Cited
U.S. PATENT DOCUMENTS

| | | | |
|---|---|---|---|
| 2,548,576 | 10/1943 | Willson | 72/1 |
| 3,196,499 | 7/1965 | Houvener | 52/272 X |
| 3,274,739 | 9/1966 | Gregoire | 52/169 |
| 3,332,170 | 7/1964 | Bangs | 49/400 |
| 4,486,994 | 12/1984 | Fisher | 52/303 |
| 4,748,780 | 6/1988 | Vinther | 52/309.3 |
| 4,754,587 | 7/1988 | Glaser | 52/282 |

Primary Examiner—David A. Scherbel
Assistant Examiner—Linda J. Hoffert
Attorney, Agent, or Firm—Rhodes, Coats & Bennett

[57] ABSTRACT

An improved building panel. The panel includes a pair of identically formed facing sheets arranged with adjacent edges extending parallel and spaced apart to one another and an insulating core between the facing sheets to minimize the transfer of heat from one facing sheet to the other through the space therebetween. The panel further includes a channel member assembly for receiving the adjacent edges of the sheets to form a joint between the sheets. The channel member assembly includes at least one pair of opposing legs extending parallel and spaced apart to one another for interconnecting the sheets with one another and a web portion extending between interconnecting the opposing legs. The web portion includes an insulating bridge member positioned between the opposing legs adjoining the pair of facing sheets to minimize the transfer of heat from one facing sheet to the other through the web portion and defining a noncontinuous space. The web portion includes a pair of structural elements offset with respect to one another and aligned along diagonally opposite edges of the insulating bridge member, at least one of the elements being adapted to abut the edge portion of the insulating core, thereby eliminating a substantial portion of the noncontinuous space to minimize the transfer of heat from one facing sheet to the other through the space.

14 Claims, 5 Drawing Sheets

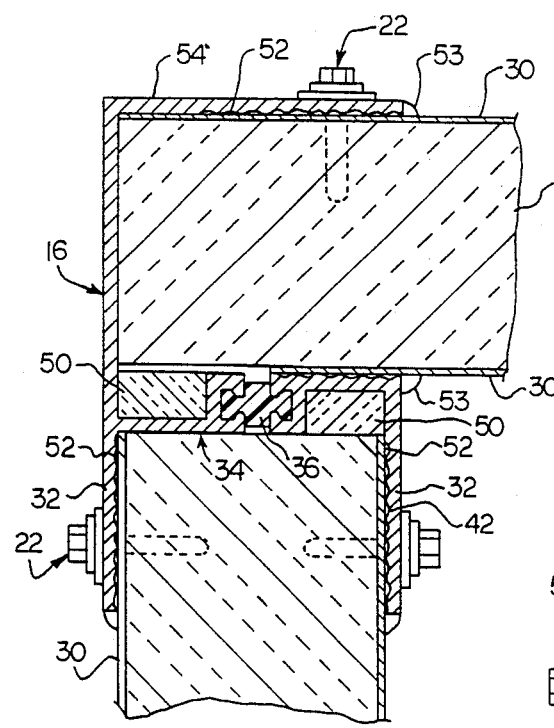
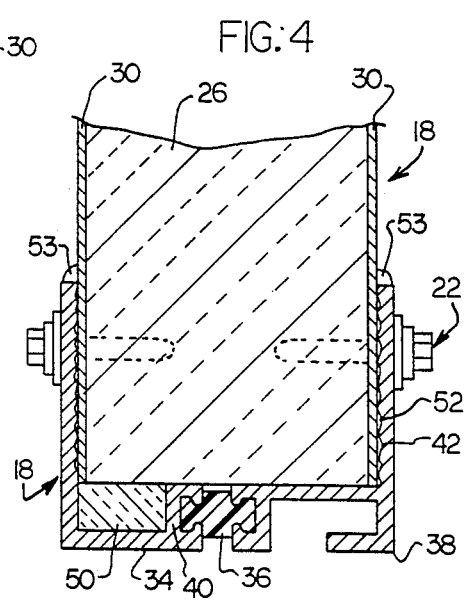
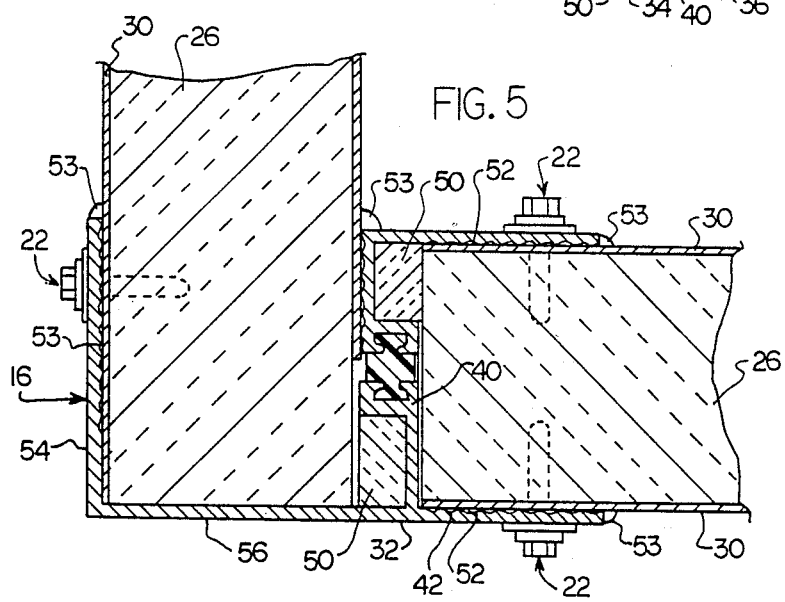

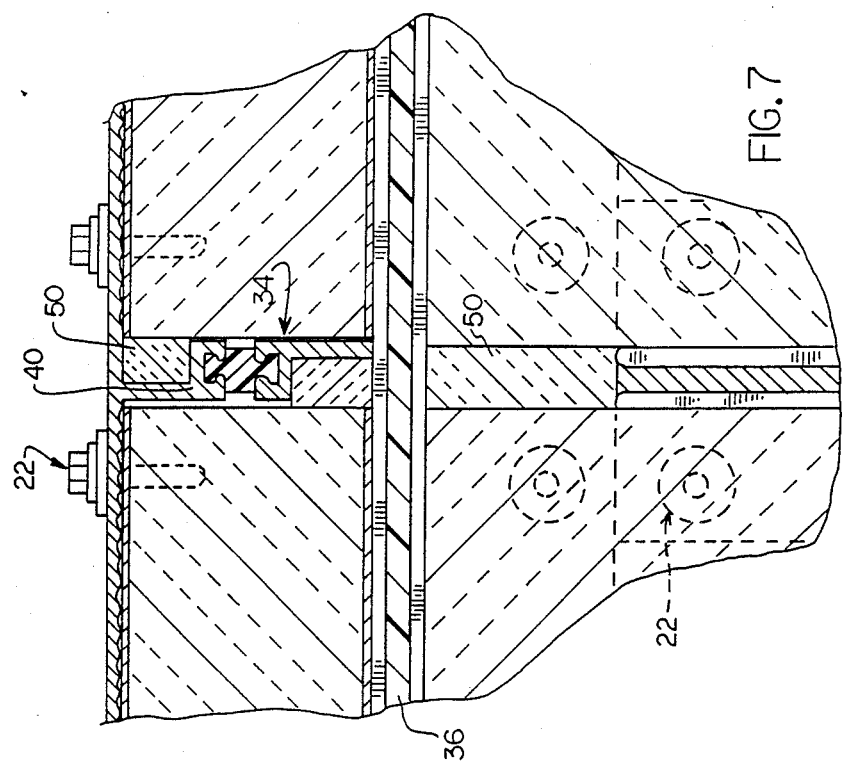
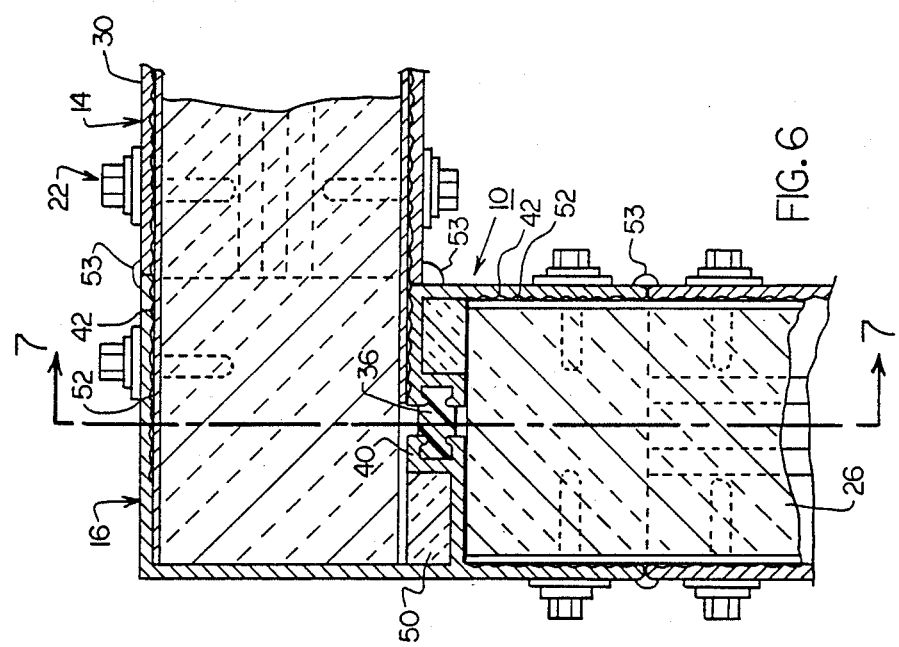

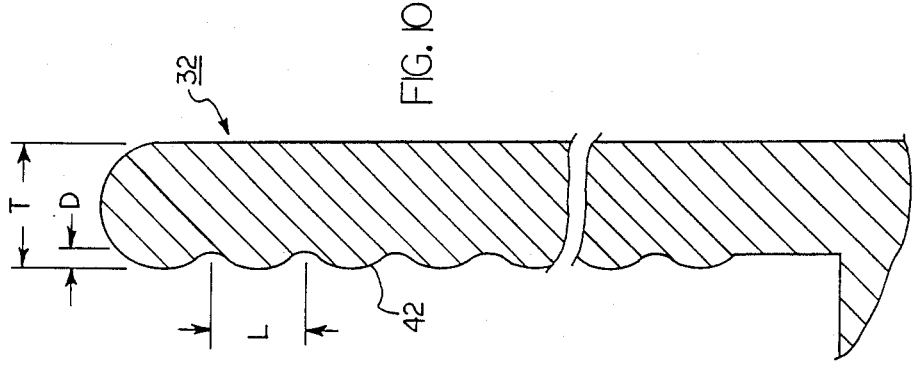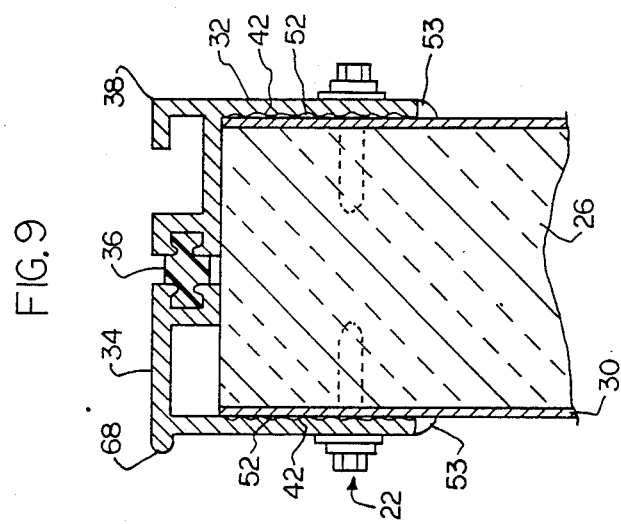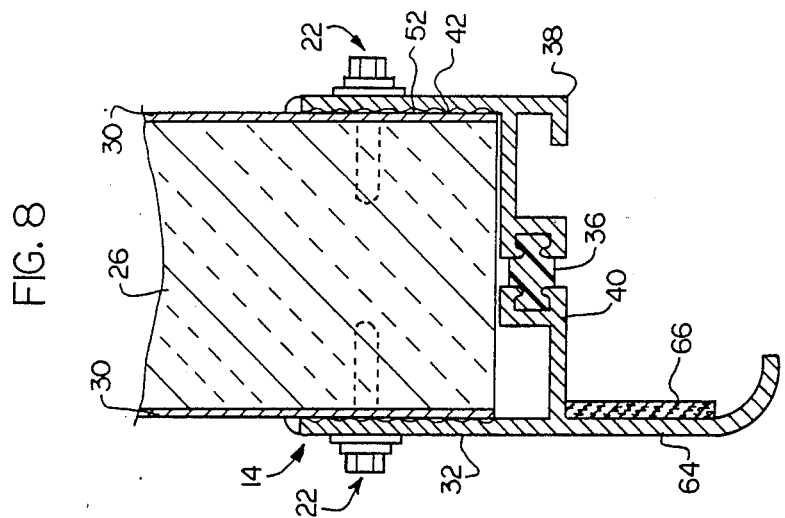

MODULAR BUILDING PANEL HAVING AN IMPROVED OFFSET THERMAL BARRIER JOINT

Background of the Invention (1) Field of the Invention

The present invention relates generally to prefabricated, modular building panels and, in particular, to an improved thermal barrier joint for such panels.

(2) Description of the Prior Art

Prefabricated, modular building panels are factory-formed then taken to the building site and assembled. Such building panels generally take the form of a pair of spaced apart walls or skins having inserted therebetween some kind of insulating core such as cork, wood and the like. In recent years, cork and wood have generally been replaced by expanded plastics, such as polyurethane, because they are rigid and self-supporting, as well as being good thermal insulators.

Even though this type of construction provides good insurance against heat transfer or leakage over a large area of the panel wall, there may be heat transfer or leakage at those areas where the inner and outer skins are connected. At these joints there may exist a continuous thermal induction path between the inner and outer skins through the joint and, hence, a region of high thermal leakage.

An earlier approach to solving this problem is illustrated in U.S. Pat. No. 3,332,170 issued to Bangs. There the panel joint comprises two spaced apart metallic sections having inter-engaging, spaced apart finger portions in the form of spaced webs mounting fins. The fins defined a labyrinthine space between the panel walls which is then filled with insulating material to completely separate the webs and fins. The resulting structural arrangement of the joint is such that there is not a continuous conduction path between metallic sections of the joint, thereby reducing thermal leakage.

Certain disadvantages become apparent with such a design. First, metallic sections of the joint must be properly aligned prior to filling with insulating material, otherwise a thermal conduction path may inadvertently be created. Second, only a limited number of insulating materials suitable for this construction are available which are both foaming as well as having sufficient compressive strength to be structurally stable (i.e., resistant to crushing).

A more widely used construction for panel joints uses a channel member assembly of the type which utilizes an insulating bridging member in the web portion of the channel member. The bridging member prevents the establishment of a metallic, thermal conducting path from the inside to the outside surface of the metallic channel member. However, the bridging member protrudes outwardly from the web portion of the joint and interferes with the close fit of the insulation contained in the panel members.

One approach to improving this type of joint is illustrated in U.S. Pat. No. 4,486,994 issued to Fisher et al. According to this technique, the entire core of the panel member is recessed an inch or two to provide clearance from the bridging member. Then, after two adjacent panels are connected by a channel member, pairs of holes, one on each side of the web, are drilled to permit the space between the core and the web of the channel member to be filled by an expanded foam insulating material. The foam sets up and hardens, thereby forming an airtight seal around the bridging member.

Certain disadvantages become apparent with such a technique. First, special equipment is required to inject the foaming plastic into the channel members Second, the technique must be used at the building site after panel joints have been connected. Third, the procedure is labor intensive since holes must be drilled on both sides of the web to perfect a seal and, therefore, expensive.

It has thus become desirable to develop an improved joint for a modular building panel that provides an improved thermal barrier at the channel member while, at the same time, eliminating the prior art problems of thermal conduction, special equipment, and the need for on-site application.

Summary of the Invention

The present invention solves the aforementioned problems associated with the prior art by providing an improved thermal barrier joint for a modular building panel by a novel channel member assembly in which the opposed web portions are offset with respect to one another and are aligned along opposite edges of the bridging member. Each of the offset web portions thereby form a surface which engages a substantial portion of the diagonally opposite edges of the insulation core of adjacent panels. Panels incorporating this offset web channel member can be prefabricated at a factory and require no additional steps or equipment at the job site.

In the preferred embodiment, a closed-cell foam or an expanded foam insulating material is inserted adjacent to the bridging member to further improve the seal between the inner and outer surfaces of the building panel. In addition, the opposing legs of the channel member assembly are grooved to retain caulking or a sealant on the surface adjacent to the panel facing sheets to provide a substantially airtight seal between the facing sheets. Caulking also may be applied externally of the channel member along the juncture between the channel member and the skin of the panel to provide an additional seal.

Accordingly, one aspect of the present invention is to provide a modular building panel having a pair of identically formed facing sheets arranged with adjacent edges extending parallel and spaced apart to one another to define a space therebetween, an insulating core in the space between the central planar surfaces of the two facing sheets to minimize the transfer of heat from one facing sheet to the other through the space therebetween, and a channel member assembly including at least one pair of opposing legs extending parallel and spaced apart to one another for interconnecting the sheets and a web portion extending between for interconnecting the opposing legs, the web portion defining a noncontinuous space, wherein the web portion further includes a pair of structural elements offset with respect to one another and aligned along opposite edges of the noncontinuous space, at least one of the elements being adapted to abut the edge portion of the insulating core, thereby eliminating a substantial portion of the noncontinuous space to minimize the transfer of heat from one facing sheet to the other through the space.

Another aspect of the present invention is to provide a channel member assembly for use in the construction of a building panel of the type having a pair of identically formed facing sheets arranged with adjacent edges extending parallel and spaced apart to one another to define a space therebetween and an insulating core in the space between the central planar surfaces of the two facing sheets to minimize the transfer of heat from one facing sheet to the other through the space therebetween. The channel member assembly includes at least one pair of opposing legs extending parallel and spaced apart to one another for receiving the adjacent edges of the sheets and forming a joint between the sheets for interconnecting the sheets with one another; a web portion extending between for interconnecting the opposing legs, the web portion defining a noncontinuous space; and wherein the web portion further includes a pair of structural elements offset with respect to one another and aligned along opposite edges of the noncontinuous space, at least one of the elements being adapted to abut the edge portion of the insulating core, thereby eliminating a substantial portion of the noncontinuous space to minimize the transfer of heat from one facing sheet to the other through the space.

Another aspect of the present invention is to provide a channel member assembly for use in the construction of a building panel of the type having a pair of identically formed facing sheets arranged with adjacent edges extending parallel and spaced apart to one another to define the space therebetween and an insulating core in the space between the central planar surfaces of the two facing sheets to minimize the transfer of heat from one facing sheet to the other through the space therebetween. The channel member assembly includes at least one pair of opposing legs extending parallel and spaced apart to one another for receiving the adjacent edges of the sheets and forming a joint between the sheets for interconnecting the sheets with one another; a web portion extending between for interconnecting the opposing legs; and means for retaining a sealant on the surface of the pair of opposing legs adjacent to the sheets, thereby providing a substantially airtight seal between the facing sheets to minimize the transfer of heat from one facing sheet to the other through the space.

Another aspect of the present invention is to provide a prefabricated building panel having a pair of identically formed facing sheets arranged with adjacent edges extending parallel and spaced apart to one another to define a space therebetween, an insulating core in the space between the central planar surfaces of the two facing sheets to minimize the transfer of heat from one facing sheet to the other through the space therebetween, and a channel member assembly for receiving the adjacent edges of the sheets and forming a joint between the sheets, the assembly including at least one pair of opposing legs extending parallel and spaced apart to one another and a web portion extending between for interconnecting the opposing legs, the web portion including an insulating bridge member positioned between the opposing legs adjoining the pair of facing sheets to minimize the transfer of heat from one facing sheet to the other through the web portion, the insulating bridge member defining a noncontinuous space, wherein, thereby eliminating the noncontinuous space to minimize the transfer of heat from one facing sheet to the other through the space.

Still another aspect of the present invention is to provide a building construction including a pair of building panels, each panel including: (i) a pair of identically formed facing sheets arranged with adjacent edges extending parallel and spaced apart to one another to define a space therebetween and (ii) an insulating core in the space between the central planar surfaces of the two facing sheets to minimize the transfer of heat from one facing sheet to the other through the space therebetween, a channel member assembly extending between for receiving the adjacent edges of the panels and forming a joint between the panels, the assembly including pairs of opposing legs extending parallel and spaced apart to one another for interconnecting the panels with one another and a web portion defining a noncontinuous space wherein the web portion further includes a pair of structural elements offset with respect to one another and aligned along opposite edges of the noncontinuous space, at least one of the elements being adapted to abut the edge portion of the insulating core, thereby eliminating a substantial portion of the noncontinuous space to minimize the transfer of heat from facing sheet to the other through the space.

These and other aspects of the present invention will be more clearly understood after review of the following description of the preferred embodiment of the invention, when considered with the drawings.

Brief Description of the Drawings

FIG. 3 is a sectional view, taken substantially line 3—3 of FIG. 1, illustrating the joint between a side and top panel;

FIG. 4 is a vertical sectional view, taken substantially along line 4—4 of FIG. 1, illustrating a joint of the lower edge of the side panels;

FIG. 5 is a horizontal sectional view taken substantially along line 5—5 of FIG. 1, illustrating the channel member shown in FIG. 3, to connect two intersecting side panels;

FIG. 6 a sectional view taken substantially along line 6—6 in FIG. 1, illustrating the channel members shown in FIGS. 2 and 3, to connect two adjoining side panels to two adjoining top panels;

FIG. 7 is a sectional view taken substantially along line 7—7 of FIG. 6.

FIG. 8 is a vertical sectional view of a channel member assembly, similar to FIG. 4, adapted to form a door frame seal.

FIG. 9 is a vertical sectional view of a channel member assembly, similar to FIG. 4, adapted to form a doorjamb which mates with the door frame shown in FIG. 8.

FIG. 10 is an enlarged sectional view of the leg of a channel member assembly, illustrating the sealant retaining grooves.

Description of the Preferred Embodiments

Figure 1:
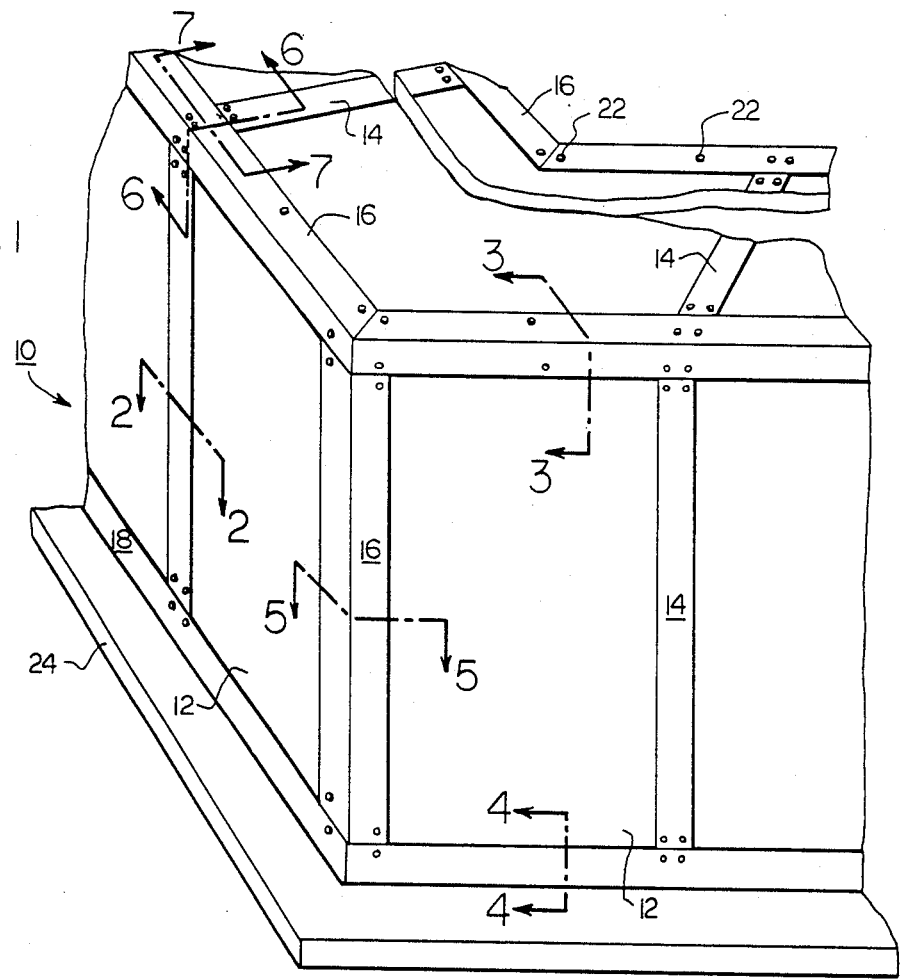
FIG. 1 is a perspective view illustrating the panel wall construction according to the present invention.

Referring now to the drawings in general and to FIG. 1 in particular, it will be understood that the illustrations are for the purpose of describing a preferred embodiment of the invention and are not intended to limit the invention hereto. As best seen in FIG. 1, an insulated conduit, generally designated 10, is shown. The insulated conduit 10 is formed by a plurality of insulated panels 12 which are arranged edge to edge. The insulated panels 12, are received and interconnected by respective channel member assemblies 14, 16 and 18. A plurality of fasteners 22 extend through the exposed surface of the channel member assemblies 14, 16 and 18 and into respective panels 12. The insulated conduit 12 is normally affixed to a base 24. However, conduit 10 may also be installed by means of hangers (not shown).

Figure 2:
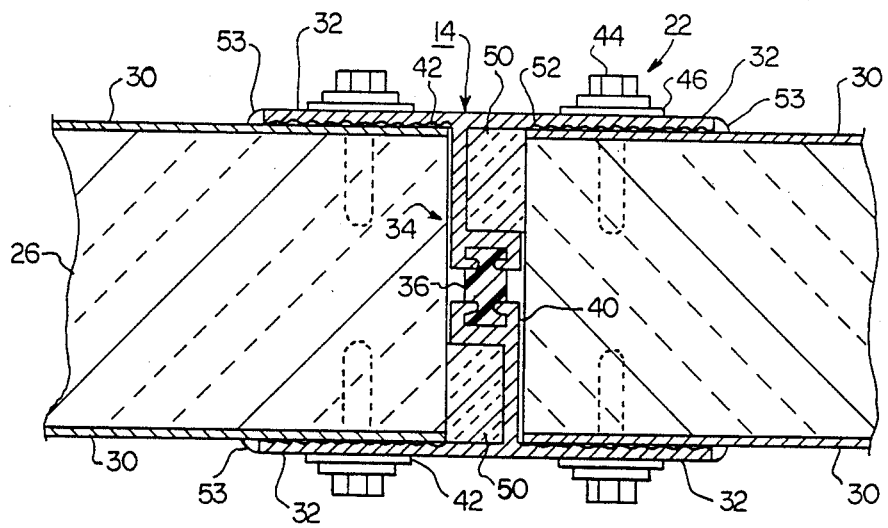
FIG. 2 is a horizontal sectional view, taken substantially along line 2—2 in FIG. 1, illustrating the joint between two adjoining panels.

The channel member assemblies 14, 16 and 18 are of several different cross-sections as best seen in FIGS. 2, 3 and 4. The choice of the proper channel member assemblies, 14, 16 and 18, depends on whether panels 12 are being joined together to form a flat surface, an edge or corner, or a base. In addition, channel member assembly 18 can be modified to form a door frame/jamb assembly as shown in FIGS. 8 and 9 as discussed later.

An example of the simplest form of the channel member assembly 14 may be best seen in FIG. 2. As can also be seen, the insulated panels 12 have an insulating core 26 in the form of an expanded rigid foam insulating material, such as polyurethane foam. The insulated panels 12 have a pair of parallel sheets 30 on opposite sides of the core 26 defining the exterior surfaces of the panels. The parallel sheets 30 are approximately equal in size to the dimensions of the underlying insulating core 26. In the preferred embodiment, the parallel sheets 30 are of a thin sheet of metal, such as aluminum, and are bonded to the foam core 26 by conventional adhesives to form an integral structural panel.

The channel member assembly 14 includes two pairs of generally parallel and opposing extending legs 32. Each pair of opposing legs 32 extend parallel and spaced apart to one another for interconnecting the pairs of panels 12 to one another. The channel member assembly 14 includes a web portion 34 which defines a noncontinuous space and extends between and interconnects the two opposing pairs of legs 32. When the panels 12 are positioned in channel member 14 and fully received thereby, the longitudinal edge portions of the parallel sheets 30 engage the web portion 34. Insulating bridge member 36 is formed therein respective web portion 34 so that the channel member assembly 14 does not provide a metallic path for the conduction of heat or cold from one surface of the panel 12 to the opposite surface. The web portions 34 each includes a pair of U-shaped prongs 40 which grasp and hold in place insulating bridge member 36.

In accordance with the present invention, the improved thermal barrier joint is achieved between the adjacent panels 12 by means of a web portion which includes a pair of structural elements offset with respect to one another and aligned along opposite edges of the noncontinuous space, at least one of the elements being adapted to abut the edge portion of the noncontinuous space to minimize the transfer of heat from one facing sheet to the other through the space.

In the preferred embodiment, the surface of opposed extending legs 32 adjacent to sheets 30 include a plurality of receiving grooves 42 for retaining an inner sealant 52. The receiving grooves 42 provide a reservoir for the sealant when the panels 12 are assembled, thereby providing a substantially airtight seal between the facing sheets 30 to minimize the transfer of heat from one facing sheet to the other.

In the preferred embodiment, a plurality of selfthreading, hex-head screws 44 are used for securing the panels 12 and the channel member assembly 14 together. A stainless steel sealing washer 46 with a neoprene bonded seal, such as manufactured by the Aztec Washer Company, Inc. of Los Angeles, Calif., forms an airtight seal between the screw 44 and outer surface of panel members 12. In addition, a resilient closed-cell foam insert 50 may be inserted prior to assembly to form an airtight seal with channel member assembly 14 to further improve the seal between the inner and outer surfaces of panel 12.

Sealant or caulking 53, such as Dow Corning 790, manufactured by the Dow Corning Company of Midland, Mich., may also be added along the outer edges of channel legs 32 to further improve the airtight seal between the inner and outer surfaces of the panel members 12. In addition, another bead of inner caulking 52 may be provided along the edges of parallel sheets 30. The caulking 52 forms an internal seal between the panel member 12 and channel member assembly 14 thereby providing improved strength and airtightness of the joint. In addition, caulking 52 is totally encased within the joint and is not exposed to weathering.

As best seen in FIG. 3, channel member assembly 16 is used to join the edges of two panels 12 forming a right angle. The channel member assembly 16 has two pairs of opposing legs adapted for receiving the respective panels 12 therein. One pair of the opposing legs extend at right angles to the other pair. Right angle channel leg 54 is connected to the outer channel leg 32 by means of channel leg connector 56. A web portion 34 extends between inner and outer channel legs 32. Web portion 34 also serves as a channel leg opposite right angle channel leg 54 and extends in an opposing, generally parallel spaced relationship to channel leg 54. Web portion 34 includes an insulating bridge member 36 similar to channel member assembly 14. Inner and outer caulking 52, 53 are utilized to provide an airtight seal, and a plurality of fasteners 22 are utilized to complete the assembly, as discussed above.

Turning now to FIG. 4, a vertical sectional view illustrating the channel member assembly 18 utilized for the lower edge of the side panels is shown. Channel member assembly 18 is similar to channel member assemblies 14 and 16 and includes a pair of opposing channel member legs 32. Web portion 34 extends therebetween and includes insulating bridging member 36. A portion of one of the opposing legs 32 is extended downwardly to form a support leg 38. Like channel member assemblies 14 and 16, the web portion 34 includes off-set prongs 40 in order to provide a flush surface on the opposite side. Caulking 52 provides an internal seal and fasteners 22 attach the channel member assembly 18 to panel 12. Like channel member assemblies 14 and 16, a closed-cell foam insert 50 may be inserted to conform to the shape of the insulating bridging member 36 and to provide an improved seal.

As best seen in FIG. 5, channel member assembly 16 may also be is used to join two panels 12 forming a right angle corner. The channel member assembly 16 has two pairs of opposing legs adapted for receiving the respective panels 12 therein. One pair of the opposing legs extends at right angles to the other pair. Right angle channel leg 54 is connected to the outer channel leg 32 by means of channel leg connector 56. A web portion 34 extends between inner and outer channel legs 32. Web portion 34 also serves as a channel leg opposite right angle channel leg 54 and extends in an opposing, generally parallel spaced relationship to channel leg 54. Web portion 34 includes an insulating bridge member 36 similar to channel member assembly 14. Inner and outer caulking 52, 53 are utilized to provide an airtight seal and a plurality of fasteners 22 are utilized to complete the assembly, as previously discussed.

FIGS. 6 and 7 illustrate the construction of insulating conduit 10 when channel member assemblies 14 and 16, shown in FIGS. 2 and 3, are utilized to connect two adjoining side panels 12 to two adjoining top panels 12. As can be seen in FIG. 6, insulating core 26 of channel member assembly 14, extends past the region surrounded by channel member assembly 14 into the area surrounded by channel member assembly 16. As best shown in FIG. 7, insulating core 26 may form gaps which are relatively small with respect to the total surface of insulating conduit 10 and normally do not form a thermal conduction or convection path. However, in the preferred embodiment, the closed-cell foam insert 50 is inserted in receiving groove 42 between the two adjacent panels. The closed-cell foam insert 50 is compressed by insulating cores 26, thereby forming an effective airtight seal.

As best seen in FIGS. 8 and 9, channel member assemblies 14, 16, and 18 may be modified to provide a door frame/jamb arrangement. For the purposes of illustration, a channel member assembly 14 has been modified. One of the opposing legs 32 is extended downwardly to provide a surface 64 for receiving a gasket 66. In the preferred embodiment, the downward extending portion 64 is curved slightly at one end to provide a more aesthetic appearance. A modified channel member assembly 14 adapted to form a door jamb which mates with the door frame shown in FIG. 8, is shown in FIG. 9. Tit 68 extends outwardly from web portion 34, thereby providing a surface to mate with sealing gasket 66.

As best seen in FIG. 10, an enlarged sectional view of one leg 32 of a channel member assembly is shown illustrating the geometry of sealant retaining grooves 42. In the preferred embodiment, the receiving grooves 42 have a sinusoidal cross-section. In addition, the depth D of the individual grooves are approximately 0.025 inches and the cross-sectional thickness of the leg 32 is 0.090 inches. Other relative dimensions could be used so long as the minimum thickness of leg 32 is sufficient to provide the required structural strength. For example, if the thickness T of leg 32 was increased from 0.090 inches to 0.1 inches, the dimension D could be increased from 0.025 to 0.035 without reducing the strength of leg 32 while significantly increasing the reservoir capacity of receiving grooves 42. Also, in the preferred embodiment, the length L between adjacent grooves is approximately 0.066 inches. Thus, in the preferred embodiment, the profile of receiving grooves 42 can be described according to the formula $F(D)=D*(\sin(2727.3L))$ where D and L represent the dimensions discussed above.

In constructing the insulating conduit 10 in accordance with the present invention, the panels 12 are first assembled in an edge to edge relationship, with respective appropriate channel member assemblies 14, 16 or 18 extending therebetween so as to form an enclosure of the desired size and configuration.

Prior to assembly, close cell foam insert 50 is inserted between the channel member assembly and the insulating core 26 to effect a more airtight seal. Fasteners 22 are used for holding the panels 12 and channel member assembly together at the joints. Then a bead of caulking 52 is provided along retaining grooves 42 between the channel member assembly and the panel skin 30 to minimized leakage of air through the panel assembly as previously described. Finally, in the preferred embodiment, an additional bead of caulking 53 is placed along the outer surface of the channel member assembly at the juncture with panel sheet 30.

After two adjacent panels are connected by a channel member, holes may be drilled through the surface of the channel leg adjacent to one of the offset web portions and through the bridging member to permit any spaces between the core and the opposed, offset web portions to be filled by an expanded foam insulating material. Because the opposed web portions are offset, it is not necessary that holes be drilled through both sides.

Certain modifications and improvements will occur to those skilled in the art and upon reading of the foregoing description. By way of example, closed-cell foam insert 50 does not have to be preformed and could be foamed in place following assembly of the panel and channel member assemblies. In addition, receiving grooves 42 could have other profiles, such as saw-tooth or semi-circular grooves. It should be understood that all such modifications and improvements have been deleted herein for the sake of conciseness and readability but are properly within the scope of the following claims.

I claim:

1. A modular building panel, comprising:
   (a) a pair of identically formed facing sheets arranged with adjacent edges extending parallel and spaced apart to one another to define a space therebetween;
   (b) an insulating core in the space between the central planar surfaces of said two facing sheets to minimize the transfer of heat from one facing sheet to the other through the space therebetween; and
   (c) a channel member assembly for receiving the adjacent edges of said sheets and forming a joint between said sheets, said assembly including at least one pair of opposing legs extending parallel and spaced apart to one another for interconnecting said sheets with one another and a web portion extending between for interconnecting the opposing legs, said web portion defining a noncontinuous space;
   (d) wherein said web portion further includes a pair of structural elements offset with respect to one another and aligned along opposite edges of said noncontinuous space, at least one of said elements being adapted to abut the edge portion of said insulating core, thereby eliminating a substantial portion of said noncontinuous space to minimize the transfer of heat from one facing sheet to the other through said space.

2. The apparatus according to claim 1, including a resilient insert adapted to be received by said noncontinuous space and to engage said channel member assembly, thereby forming a substantially air tight seal between said facing sheets.

3. The apparatus according to claim 2, wherein said insert is a closed-cell foam insulating material.

4. The apparatus according to claim 1, including a hardenable filler received by said noncontinuous space and engaging said channel member assembly, thereby forming a substantially air tight seal between said facing sheets.

5. The apparatus according to claim 4, wherein said hardenable filler is an expanded foam insulating material.

6. A channel member assembly for use in the construction of a building panel of the type having a pair of identically formed facing sheets arranged with adjacent edges extending parallel and spaced apart to one another to define a space therebetween and an insulating core in the space between the central planar surfaces of said two facing sheets to minimize the transfer of heat from one facing sheet to the other through the space therebetween, said channel member assembly comprising:

(a) at least one pair of opposing legs extending parallel and spaced apart to one another for receiving the adjacent edges of said sheets and forming a joint between said sheets for interconnecting said sheets with one another;

(b) a web portion extending between for interconnecting the opposing legs, said web portion defining a noncontinuous space; and (c) wherein said web portion further includes a pair of structural elements offset with respect to one another and aligned along opposite edges of said noncontinuous space, at least one of said elements being adapted to abut the edge portion of said insulating core, thereby eliminating a substantial portion of said noncontinuous space to minimize the transfer of heat from one facing sheet to the other through said space.

7. The channel member assembly according to claim 6, further including means for retaining a sealant on the surface of said pair of opposing legs adjacent to said sheets, thereby providing a substantially air tight seal between said facing sheets to minimize the transfer of heat from one facing sheet to the other through said space.

8. A channel member assembly for use in the construction of a building panel of the type having a pair of identically formed facing sheets arranged with adjacent edges extending parallel and spaced apart to one another to define a space therebetween and an insulating core in the space between the central planar surfaces of said two facing sheets to minimize the transfer of heat from one facing sheet to the other through the space therebetween, said channel member assembly comprising:

(a) at least one pair of opposing legs extending parallel and spaced apart to one another for receiving the adjacent edges of said sheets and forming a joint between said sheets for interconnecting said sheets with one another;

(b) a web portion extending between for interconnecting the opposing legs; and (c) means for retaining a sealant on the surface of said pair of opposing legs adjacent to said sheets, thereby providing a substantially air tight seal between said facing sheets to minimize the transfer of heat from one facing sheet to the other through said space.

9. The channel member assembly according to claim 8, wherein said means for retaining a sealant on the surface of said pair of opposing legs adjacent to said sheets includes a plurality of receiving grooves.

10. The channel member assembly according to claim 9, wherein said plurality of receiving grooves are aligned parallel to the edge of said facing sheets.

11. The channel member assembly according to claim 10, wherein said plurality of receiving grooves have a sinusoidal cross section.

12. A prefabricated building panel, comprising:

(a) a pair of identically formed facing sheets arranged with adjacent edges extending parallel and spaced apart to one another to define a space therebetween;

(b) an insulating core in the space between the central planar surfaces of said two facing sheets to minimize the transfer of heat from one facing sheet to the other through the space therebetween; and (c) a channel member assembly for receiving the adjacent edges of said sheets and forming a joint between said sheets, said assembly including at least one pair of opposing legs extending parallel and spaced apart to one another for interconnecting said sheets with one another and a web portion extending between for interconnecting the opposing legs, said web portion including an insulating bridge member positioned between the opposing legs adjoining said pair of facing sheets to minimize the transfer of heat from one facing sheet to the other through said web portion, said insulating bridge member defining a noncontinuous space;

(d) wherein said web portion further includes a pair of structural elements offset with respect to one another and aligned along diagonally opposite edges of said insulating bridge member, at least one of said elements being adapted to abut the edge portion of said insulating core, thereby eliminating a substantial portion of said noncontinuous space to minimize the transfer of heat from one facing sheet to the other through said space.

13. A building construction comprising:

(a) a pair of building panels, each panel including: (i) a pair of identically formed facing sheets arranged with adjacent edges extending parallel and spaced apart to one another to define a space therebetween; and (ii) an insulating core in the space between the central planar surfaces of said two facing sheets to minimize the transfer of heat from one facing sheet to the other through the space therebetween;

(b) a channel member assembly extending between for receiving the adjacent edges of said panels and forming a joint between said panels, said assembly including pairs of opposing legs extending parallel and spaced apart to one another for interconnecting said panels with one another and a web portion extending between for interconnecting the opposing legs, said web portion defining a noncontinuous space;

(d) wherein said web portion further includes a pair of structural elements offset with respect to one another and aligned along opposite edges of said noncontinuous space, at least one of said elements being adapted to abut the edge portion of said insulating core, thereby eliminating a substantial portion of said noncontinuous space to minimize the transfer of heat from one facing sheet to the other through said space.

14. The construction according to claim 13, including an insulating bridge member positioned between the opposing legs adjoining said pair of facing sheets to minimize the transfer of heat from one facing sheet to the other through said web portion.

* * * * *